July 3, 1923.
M. C. HOPKINS
1,460,673
METHOD OF COLOR PHOTOGRAPHY AND PHOTOGRAPHIC ELEMENTS
Filed May 6, 1916   2 Sheets-Sheet 1
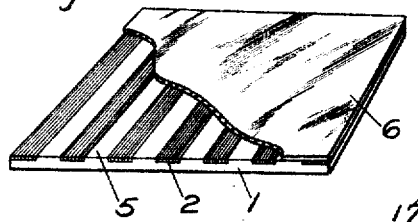
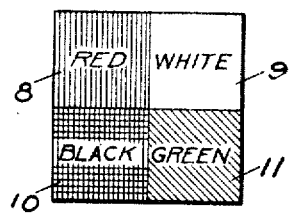
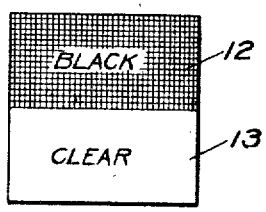
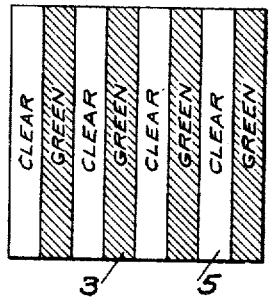
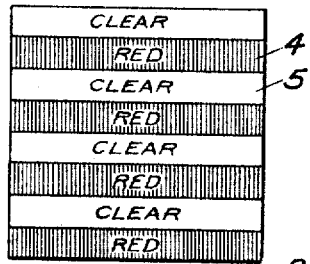
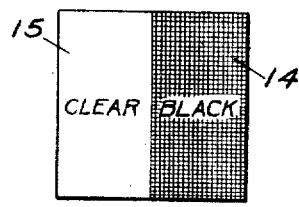
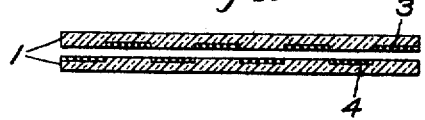
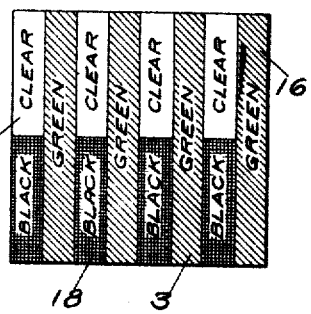
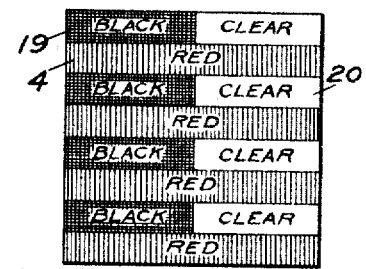
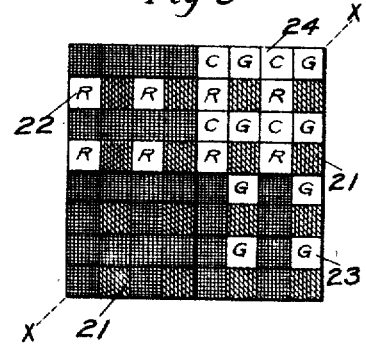
WITNESSES:
INVENTOR
Marcus C. Hopkins
BY
Clayton L. Jenks
ATTORNEY

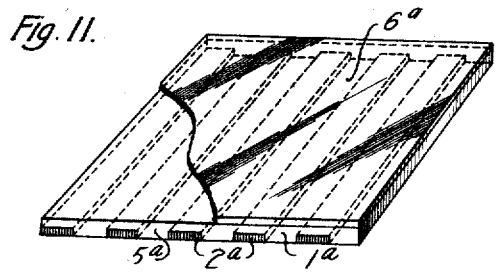
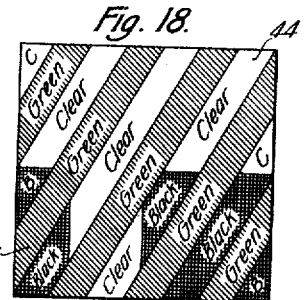
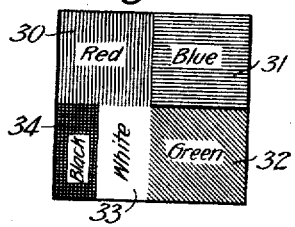
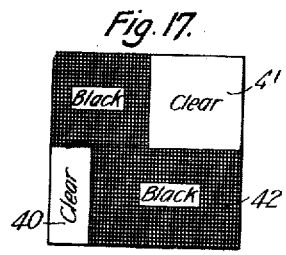
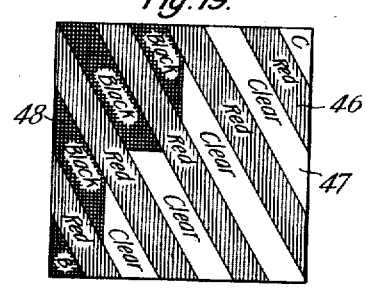
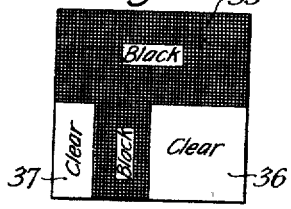
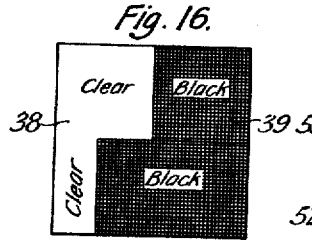
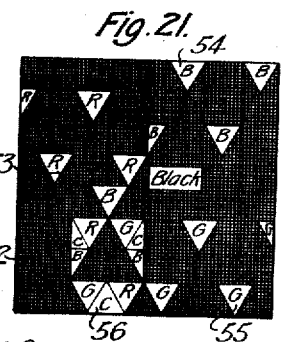
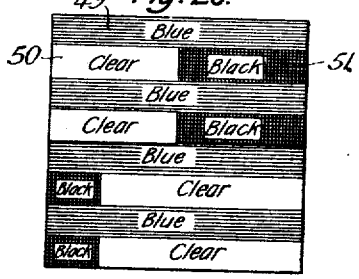

Patented July 3, 1923.

1,460,673

UNITED STATES PATENT OFFICE.

MARCUS C. HOPKINS, OF ROCHESTER, NEW YORK, ASSIGNOR TO EASTMAN KODAK COMPANY, OF ROCHESTER, NEW YORK, A CORPORATION OF NEW YORK.

METHOD OF COLOR PHOTOGRAPHY AND PHOTOGRAPHIC ELEMENTS

Application filed May 6, 1916. Serial No. 95,967.

*To all whom it may concern:*

Be it known that I, MARCUS C. HOPKINS, of Rochester, in the county of Monroe and State of New York, have invented certain new and useful Improvements in a Method of Color Photography and Photographic Elements; and I do hereby declare the following to be a full, clear, and exact description of the same, reference being had to the accompanying drawings, forming a part of this specification, and to the reference characters marked thereon.

My invention relates to color photography and more particularly to photographic elements and a method of recording color value images of a given subject and obtaining a photograph in colors.

One object of my invention is to provide a photographic element by the employment of which pictures in color may be made by one familiar with the usual manipulations of the silver image in black and white photography, and to provide a simple and facile method of preparing photographic color records, involving well known developing, fixing and finishing operations, without necessitating coloring the images, to reproduce the colors of the subject photographed. A further object is to provide a complete set of photographically sensitive color components ready for the photographer's use for recording separate color images of the subject, such components to require only a reasonably accurate registration of the images when superimposed to complete a visual record of the subject in color. With these and other objects in view, which will appear from the following disclosure, my invention consists of certain improvements and combination of parts, the novel features of which will be pointed out in the appended claims.

Two, three or more negatives taken of a subject, alike in every respect, except in that the light that impresses the sensitive material in each case is of a different color, form what is known in the art as a set of color separation negatives. From such a set of negatives, a positive record of the subject may be reproduced in colors by either the additive or the subtractive method. The subject matter of this invention is directed mainly to a method and means for easily producing from a set of separation negatives any number of viewable color records of the additive type. The additive method requires that two or more colored positives of the subject be viewed in the same place and, in the absence of means for successively bringing the several positives to the same position with great rapidity, at the same time. By separate projection, the several colored positives may be superimposed upon a screen, each in its entirety, but in the case of a viewable record in the nature of a transparency or print, minute portions of the several colored images may be interspersed or juxtaposed so as to produce within the eye a blending of the image colors into the tints and hues of a complete colored record.

Assuming that a sufficiently true rendering of color values will be obtained by a two color process involving the use of two substantially complementary colors and two sensitive photographic plate, film or paper components, then in accordance with one phase of my invention, I juxtapose or combine, for example, a red color value photographic positive image on a suitably sensitized surface and a green color screen, in such a manner that small portions of the photographic positive are interspersed or juxtaposed with but not superimposed upon small color areas of the screen. Similarly, upon the other component the red color screen is interspersed or juxtaposed with but not superimposed upon the green color value positive image there recorded. When the components are superimposed and the images thereon are in registry, each color screen area associated with each component is so located as to overlap a portion of the image on the other component and, as in my preferred type, a portion of a color area of the other screen. As a result the red color value image associated with the green screen is viewed through portions of the red screen, while the green color value image associated with the red screen is viewed through the green color screen areas, the two images being associated in the eye as a record in color of the subject.

Referring to the accompanying drawings in which like reference characters indicate like parts, I have illustrated diagrammatically and on an exaggerated scale a preferred form of my invention, but it will be understood that various modifications of structure and method may be made within the scope of my claims without departing from the spirit of my invention.

Fig. 1 is a perspective view of a photographically sensitive film showing the coating broken away.

Fig. 2 is a face view of the green lined film.

Fig. 3 is a face view of the red lined film.

Fig. 4 is intended to represent on an enlarged scale, a small portion of a colored subject which is to be photographed, and may be considered, for the sake of simplicity of illustration, to be made up of squares of black and white and the two colors red and green, practical complementary colors of the spectrum.

Fig. 5 represents a negative obtained by photographing the subject shown in Fig. 4 through a filter capable of transmitting mainly the red rays of light on a panchromatic or other suitable red sensitive photographic element.

Fig. 6 represents similarly the negative produced by the use of a green filter on a green sensitive or a panchromatic plate.

Fig. 7 shows a positive printed with red light from the red color value negative shown in Fig. 5 onto the green lined film of Fig. 2.

Fig. 8 shows a positive printed from the green color value negative of Fig. 6 onto the red lined film of Fig. 3, a green filter being interposed if the emulsion is red sensitive.

Fig. 9 shows the result of superimposing the printed red and green lined films represented in Figs. 7 and 8, the combined films when properly illuminated appearing to the eye as colored similarly to the object illustrated in Fig. 4.

Fig. 10 shows a section on line x—x of Fig. 9 of the two components when superimposed but without photographic material thereon.

Figure 11 is a perspective view of a modified form of my film showing the coating broken/away.

Figures 12 and 13 are transverse sectional views of further modifications.

Figure 14 is a diagrammatic view of a small portion of a colored chart or test object on an enlarged scale.

Figure 15 represents, on a large scale, a negative obtained by photographing the subject shown in Figure 14 through a magenta or minus-green filter on to a panchromatic plate.

Figure 16 represents a negative taken similarly through a blue-green or minus-red filter.

Figure 17 represents similarly the negative obtained when using a yellow or minus-blue filter.

Figure 18 shows, on a still larger scale, a positive printed from the negative shown in Figure 15.

Figure 19 shows similarly a positive printed from the negative shown in Figure 16.

Figure 20 shows similarly a positive obtained by printing from the negative shown in Figure 17.

Figure 21 shows the final positive obtained by superposition of the positives shown in Figures 18, 19, and 20.

In the practice of my invention a set of separation negatives of the subject should first be recorded either simultaneously or successively on ordinary but suitably sensitized photographic elements by light passing through proper filters, which are preferably of such colors that the additive product of the light rays passing through all the filters is substantially white, i. e., the filters have substantially complementary colors if a two color process is to be employed. From each of these negatives a positive is prepared upon one of my sensitive components having mono-color screen areas which are approximately complementary in color to the color of the filter through which was taken the negative being printed, this positive being so printed that only the portion of the surface of the sensitive component not having on it colored screen areas bears the photographic positive, as may be accomplished, for instance, by printing through the back of a transparent component having a layer of sensitive material over the separated color areas by means of light of such a color that it cannot penetrate through the screen areas and therefore can only form the positive in the spaces between the color areas, the portions of the positive so obtained, therefore, being interspersed between the screen areas. Upon developing, fixing and finishing the positives by ordinary operations, they may be superimposed and the images registered, whereupon a color photograph results.

In order that the construction of my preferred types of photographic components may be understood, reference is made to Fig. 1, which illustrates a transparent or translucid support 1 of a suitable material, such as film base, glass or paper having thereon separated areas 2 of a color designed to serve as a light screen. As here illustrated, these areas are produced by permeating a film base to a slight depth with dye. For the complementary components, I provide as shown in Fig. 2 a film support bearing green color areas 3 and, as shown in Fig. 3, a further support having red color areas 4 thereon.

The color screen areas on each film component, which preferably embody geometrical designs or other substantially uniform shapes, are interspersed with clear, transparent or translucid spaces 5, or with colored non-filter portions, which transmit light of a color complementary to that of the filter areas 2 or light which is not transmitted by said areas. Since the spaces 5 are not intended to serve as filters, but act as windows for the passage of the printing light to the sensitive material, they will herein be considered as "clear" spaces. While the spaces 5 may be colored, as indicated, it is preferable, in order to obtain better color results, that they be transparent so as to give a better rendering of white and grey colors. These spaces 5 are so located with reference to the edges of their respective films, illustrated in Figs. 2 and 3, or the portions of the images recorded thereon and placed in registry when the films are superimposed, that portions of the color filter areas on each film overlie clear or non-filter portions on the other film component. As illustrated in exaggerated view, the color areas 2 preferably comprise fine, parallel, straight lines of a uniform color separated by clear spaces 5 of the same width.

In the practice of my invention, I prefer to have the sensitive material on the same support that carries the color areas. This material is accordingly so positioned that broken images may be recorded thereon by light transmitted through the clear spaces 5 and not transmitted by the color areas 2; hence the photographic material which is to record the image is located in or opposed to the clear or non-filter spaces 5 between and interspersed with the color lines 2. In my preferred type of invention I find it practicable to place this material not only between the color lines in the clear spaces 5 but also in the rear of the lines 2 in the form of a layer over the whole surface of the film component, although it is to be noted that the material beneath the color lines takes no part in the process, as it is removed by the subsequent fixing operation, thus leaving the color filter 2 unobstructed.

It is essential when preparing the positive image that the color areas 2 be interposed between the sensitive material and the source of light. Hence, in my preferred form, I place the color lines on one side of a substantially transparent film base support and interperse therewith lines of sensitive material adapted to bear image portions by superimposing over the color lines and clear spaces on the support 1 a sensitive body which may comprise, as illustrated in Fig. 1, a layer 6 of photographically sensitive silver emulsion. The color lines may be located on the opposite sides of a thin support from the emulsion, but it is desirable to have the color lines and sensitized material closely adjacent each other to avoid difficulties of parallax. In Figure 11 I have thus shown the filter or color lines or units $2^a$ interspersed with the clear lines or units $5^a$ upon one side of the support $1^a$ which carries on the opposite side the sensitive layer $6^a$.

Assuming that the color lines on each plate are of uniform size and separation, then the color lines on one film may be registered between the color lines on the other film, overlying the clear spaces, if the films are superimposed with the lines on the two in parallel relation, as may be accomplished by orienting one of the films of Fig. 2 or 3 through the necessary angle. As, however, this arrangement requires the difficult operation of registration of very fine lines or areas and the necessity that the lines and clear spaces be uniform in design and dimensions, I prefer to arrange the colored portions so that each colored area overlaps not only a clear space, but also a portion of a color area on the other film. This may be simply accomplished by preparing one film with preferably parallel lines of one color separated by clear spaces and the other film with parallel lines of the other color which lie at an angle to the lines on the first film so as to intersect the same when the films are properly superimposed. The films or other components may be alike except as to color, in which case one is employed with the color lines in one position and the other with the lines at right angles to the direction assumed by the first lines.

The size of the color lines may obviously be varied, but I find that satisfactory results are obtained by spacing such lines to provide about 120 to the inch, separated by clear spaces of about the same width. If it is not practicable or feasible to have the relative densities or luminosities of the red and green colors used on the screen components the same, the tendency to distort the resultant appearance of the picture may be overcome and a balance obtained by increasing or decreasing the width of the color lines on one or both of the components. While the color lines may be located on two separate supports independent of the sensitive elements, or it is possible for viewing purposes to have the same on a single support, which may be superimposed with the two sensitive elements bearing the positive color value images, I, however, prefer for the sake of simplicity and compactness to locate each color screen on the same support which carries the sensitive material. Thus in Figure 12 I have shown the support divided into two parts, $1^b$ and $1^c$, the part $1^b$ carrying the sensitive layer $6^b$, the part $1^c$ carrying the color or filter areas or units $3^c$. Similarly the support part $1^a$ carries the sensitive layer $6^a$, and the support part $1^d$ carries the color units $4^d$. In Figure 13 I have shown a modification wherein the support parts $1^f$ and $1^h$ carry the sensitive layers $6^f$ and $6^h$, while the color or filter units or areas, $3^s$ and $4^s$, are carried by the support part $1^s$.

Theoretically, the color of each screen should be complementary to that of the other screen, so that if one screen involves a given portion of the visible spectrum, as, for example, the green-blue wave lengths, the other screen would comprise the remainder of the spectrum to which the photographic element associated with it is sensitive. The screen colors, however, must be selected as the result of comparison between various practical factors tending to affect the character of the picture. For example, I find that in a two-color process it is desirable to use colors herein specified as the mono-colors red and green, but actually comprising colors involving mainly the red-orange and the blue-green portions of the spectrum. Hence, the expression "complementary colors" will be used throughout this specification to cover in a broad, general and non-technical sense those wave lengths of light to which the photographic elements are sensitive and which involve practically those colors which are substantially complementary and accomplish the purposes of my invention. The terms "red" and "green" will similarly be employed to cover any suitable complementary colors, as equivalents, while the expression "mono-color" will be utilized to indicate that a single color effect upon the eye is produced and that two visually different colors are not used in the same locality.

It is obvious that the manner of preparing the color lines depends on the nature of the support, and may be accomplished in various ways. For the sake of clearness of illustration the following method may be adopted in case the support is made of nitrocellulose or a usual type of film base. Lines are printed on the support in a resist ink by a suitable press, after which the remaining exposed surface between the lines is dyed the proper color, the dye probably penetrating somewhat into the film base, as shown roughly in Fig. 1. The resist ink is then removed by a solvent that will not materially affect the film base and the dye, thus leaving the dyed lines 2 with the clear spaces 5 therebetween. After the color lines have been produced, the sensitive material 6 is placed on the film in any suitable way. However, so far as the general structure set forth in my claims is concerned, it is immaterial by what process the lined components may be prepared.

Although I have described specifically my invention as related to a two-color process, it is obvious that it is applicable to a three-color or a multi-color process as well. If three-color values are to be recorded, a third color separation negative is prepared and a positive made therefrom in the manner above described on a screen plate having lines of a color complementary to that of the color value of the negative, the lines being positioned at an angle to each of the directions normally assumed by the lines on the other plates. The three positives when completed have but to be superimposed with the images in registry, to constitute a picture in colors.

In Figure 14 I have shown on an enlarged scale a chart having a red area 30, blue area 31, green area 32, white area 33, and black area 34. If this is photographed on a panchromatic plate through a minus-green filter and a negative is made in the usual way, there will result a black area 35 and clear areas 36 and 37, the latter corresponding to the green and black spaces of the test chart. Similarly, the negative indicated in Figure 16 is obtained by using a minus-red filter so that black area 39 and clear area 38 are formed. Figure 17 represents the negative obtained through a minus-blue filter, the result being clear areas 40 and 41 and black area 42. These negatives are respectively printed upon green lined, red lined, and blue lined positive films in a way that will be readily understood from the description of the two-color process hereinabove given, the results being indicated in Figures 18, 19, and 20. During printing the lines of the respective positive elements are placed at different angles relative to the vertical lines of the negative images. Preferably, as shown, the angles are such that when the positive images are registered, as shown in Figure 21, the respective color lines will cross each other at angles of 60 degrees, although my invention is, of course, limited to no particular angle or pattern. In Figure 18 the clear spaces are indicated at 44, the green spaces at 43, and the black spaces at 45. In Figure 19 the clear spaces are indicated at 47, the red spaces at 46, and the black spaces at 48. In Figure 20 the clear spaces are shown at 50, the blue spaces at 49, and the black areas at 51.

When the positives indicated in Figures 18, 19, and 20 are superposed, as indicated at Figure 21, there will, of course, be black areas wherever black areas occur in the positive elements. There will also be black areas wherever the color lines cross one another, for instance, if a red line crosses a blue line, the two together will absorb all of the components of white light. As a result the only color areas which will show are those where a color filter is opposite a clear space. In Figure 21, 53 represents such red areas, 54 the blue areas, 55 the green areas, and 56 the clear areas. It will be further noted in Figure 21 that the red areas occur in the portion corresponding to the red area 30 of the test chart. The blue areas occur in the corner which represents the blue area 31 of the test chart. The green areas occur in the corner corresponding to the green area 32 of the test chart, and equal amounts of red, green, blue, and clear areas appear in the rectangle corresponding to the white area 33 of the test chart. It will thus be clear that my process is adapted to multiple color processes as well as to the two-color form hereinabove described.

In order to carry out my process, if a two-color record is to be made by means of the two green and red lined screen films, or other components bearing silver emulsion, as described above, the following general steps are involved: A given color subject, having colored portions red 8, white 9, black 10 and green 11, represented diagrammatically in Fig. 4, is photographed on a panchromatic plate, film or paper or other photographic element that is sensitized to the red portion of the spectrum. A suitable ray filter, capable of transmitting red and orange and excluding sufficient of the remaining rays of white light that the resulting negative image will record mainly the red-orange color values of the subject is interposed in the path of light. A second negative is made of the same subject, preferably simultaneously with the recording of the red image if still life is not being photographed, on a photographic element which is sensitized to green and blue, a filter being used which transmits mainly green and blue light. These plates exposed to the red and green rays, are to be treated in any suitable manner, as by developing and fixing in proper baths, to make negatives bearing black and white or other types of images, such that positives may be made therefrom, as by projection or contact printing. I prefer to make these negatives the reverse of each other, so that the positive images may be superimposed in contact.

Referring to Figs. 4 and 5, it will be seen that the rays from the red and white parts of the subject (Fig. 4) are transmitted through the red filter, resulting after development in a light resisting or an opaque deposit 12 on the portion of the negative affected by these rays. As insufficient amount of actinic light passes through the red filter from the black and green portions of the subject to affect the sensitized emulsion materially, there results the formation of a clear space 13 on the developed negatives.

Similarly, an opaque silver deposit 14 (Fig. 6) remains after development where the second negative has been affected by the rays from the white and green portions of the object (Fig. 4) which passes through the green filter, and a clear space 15 results from the fact that no actinic rays from the red and black portions are transmitted. Thus far, the operations comprise merely the taking of two similar pictures through complementarily colored filters, and developing and finishing them by the usual methods.

The next essential step in the process involves printing the negative images on my color screen components to form the color positives, and may be accomplished in the following general manner: The negative image (Fig. 5) recording the red color values of the object, is printed on the green lined screen component (Fig. 2) by light comprising mainly the red portion of the spectrum, or by light which has such a relation to the color of the screen that it will be intercepted by the green lines to prevent an image appearing on the sensitive emulsion beneath the colored areas, thus producing a positive image of a red color value between the green lines. The positive image is developed and otherwise rendered permanent by the ordinary photographic operations involved in black and white photography.

From the foregoing, it will be seen that it is the areas of sensitive film 6 above the windows 5, which are the essential elements in the image formation. They are sharply distinguished, both in position and function, from the sensitive portions of the layer 6 directly over the colored areas 2. Furthermore, while I have illustrated the colored filters 2 and the windows or clear spaces 5 as integral with the support 1, they are both in location and function distinct from such support and are separate elements of the invention. It will further be seen that the essential portions or areas of the sensitive layer 6, which are above the windows or clear elements 5, are alternated with the color filters or elements 2 when considered with respect to the light used in printing. While these sensitive areas above the clear spaces 5 are not shown in the same plane as the color filters 2, they are contiguous to a common plane and are interspersed for practical purposes in performing their functions.

Referring to Figs. 2, 4 and 7, and considering the negative (Fig. 5) and the green lined film component (Fig. 2) as superimposed for printing by light passing through the negative to the lined film, it will be seen that the dark portion 12 tends to shut off the rays of light, so that the emulsion (Fig. 7) beneath the upper half 16 of the green lines 3 and in the spaces 17 will not be materially affected, resulting in these portions appearing respectively green and transparent or clear after development and fixation. On the other hand, the clear or transparent portion 13 of the negative shown in Fig. 5 will transmit the red light to the green lined film. This light being absorbed by the green color lines, will not materially affect the emulsion therebeneath, thus permitting the removal of the silver salt from the emulsion by fixation and leaving the green lines substantially uncovered throughout their entire extent. The light does, however, reach the sensitized spaces 18, so that after development a black deposit is found to cover these portions. Accordingly, as shown in Fig. 7, one-quarter of the plate is transparent, one-quarter opaque and one-half green.

In a similar manner, the red lined film (Fig. 3) is printed from the negative (Fig. 6) which records the green color values of the subject shown in Fig. 4. If the film is not sensitive to red light, no filter need be used; otherwise a green filter transmitting green rays is interposed in the path of the light, the essential consideration being not to permit transmission of light through the red lines to affect any sensitive emulsion beneath to any material extent. A result such as shown in Fig. 8 is produced after development and fixation, wherein the portions 19 covering one-half of the space between the red lines is rendered light excluding or black, due to the green light passing through the clear space 15 of the negative and affecting the sensitized material. The emulsion in the portions 20 is not affected, since the green light is substantially stopped by the light resisting portion 14 of the negative image, while the emulsion behind the red line spaces is unaffected and subsequently removed by the fixing process, leaving these spaces as red colored windows between the image portions.

Any suitable means and methods for making the positives are, of course, available, care always being taken to have the color lines on the screen component between the negative image and the sensitive emulsion, to prevent printing an image on the emulsion opposite the filter areas 2. The light may be from any convenient source and of any wave lengths, provided it does not penetrate materially the color lines to affect the emulsion beneath.

After the positive film components, printed as shown in Figs. 7 and 8, have been developed, fixed and otherwise finished to render the images visible and permanent, the only essential operation remaining is the simple one of properly registering the images in a superimposed relation. Since the red and green and picture lines of the two plates cross, it is not essential as by other known processes to register these lines by micrometer arrangements or otherwise. Instead, it is merely necessary to shift the two plates by hand over each other until the images coincide, after which they may, if desired, be fastened together by any suitable means, as binding tape, and placed in a suitable transparency holder or illuminator, whereupon the image may be seen in substantially its natural colors, the truthfulness of the color rendering depending, of course, upon various conditions, such as the colors of the lines on the plates, the character of the illumination, the manipulation of the plates at the various stages of their exposure and treatment, etc.

If the images on the two negatives were made the reverse of each other, i. e., right and left hand images, then the positive plates may be superimposed with the images and color screens substantially in contact, thus avoiding parallax.

As shown in Figs. 9 and 10, the color lines are presented in alternate relation, except where they cross, the green and red colors on each component being opposite clear spaces between the colors on the other component, to serve as colored windows or filters for viewing the image portions located in or opposite the clear spaces. Upon examination of the element shown in Fig. 9, it is seen that an opaque spot 21 appears where the green lines and red lines cross. Due to the red lines intersecting the picture or silver deposit lines on the green film, a red positive is had, as represented by the squares 22. Where the green lines cross the silver deposit lines on the red component, a green positive 23 is obtained and where the silver deposit lines cross a composite positive 24 in black and white results, as represented by the squares labeled "C." The black and white composite picture is double the density of the red one or the green one; the red and green images are of single density.

The final product should be illuminated by suitable light, theoretically white if two complementary screen colors were used, but practically so related to the colors of the screens as to give the best balance in effect. In viewing the superimposed fine lined films, the effect upon the eye if white light is employed to illuminate the element is that the element appears to be red in the upper left hand corner due to the transmission of red rays through the red spaces 22, the black spaces merely cutting down the total amount of illumination. Similarly the lower right hand quarter of the picture appears green. The upper right hand quarter on the other hand transmits white light through the clear spaces 24 and both red and green rays in equal proportions through spaces 22 and 23, but by an optical addition these colors red and green, if purely complementary, produce white. Hence this quarter appears white to the eye. The lower left hand corner portion transmits no light and appears black. It is obvious that even if subjects having a greater variety of tones and colors are photographed, the same general principles apply.

By utilizing the type of photographic element described, I have found it possible to produce a pleasing and faithful color record of a subject wherein color positive images are intermingled with black and white positive images of much steeper tone graduation than that of the colored images.

It is difficult to make two sensitive emulsions that give the same tone gradations with green and red lights or with different colored lights, as is required in known processes of color photography. It is, therefore, a decided advantage in my system that each of the component plates can be manipulated for tone gradation separately, as for example to intensify or reduce the image. This can be accomplished in daylight by the usual methods and the results checked up at any moment by placing the plates together to view the combined result. Furthermore, these separate plates need not be developed alike or may be otherwise differently treated as is found desirable to produce the best tone gradation or control and give the most pleasing results.

While I have shown various black areas in the illustrations given, such areas would, of course, be made up of graded opacities when the subject to be reproduced is made of corresponding gradations. The sensitive photographic emulsion or layer is of such a nature as to yield approximately correct gradations or opacities.

Having thus described my invention, what I claim as new and desire to secure by Letters Patent is:

1. In a photographic element for use in color photography, the combination with a translucid support of filter elements thereon, there being windows separating said filter elements, and light sensitive emulsion opposite said windows to receive light therethrough, each separated filter element being of one color throughout its entire area.

2. A photographic element for use in color photography, consisting of a translucid support having spaced filter areas thereon of a color complementary to that of the color to be recorded, and having photographic material thereon between the filter areas and sensitized for, and adapted to record as a broken photographic image, a given color value of a subject.

3. A photographic element for recording the component values of one color of an object, comprising a translucid support having a screen thereon of one color substantially complementary to said color of the object to be recorded and made up of color areas separated by uncolored areas, and photographic material opposed to said uncolored areas and sensitized to a color complementary to the color of the screen.

4. A photographic element comprising a transparent support carrying a layer of photographic material sensitive to a given color and adapted to record a corresponding color value of a subject, said support having thereon separated color areas adjacent said layer and capable of preventing the transmission therethrough of actinic light corresponding with that represented by the color value of the subject to be recorded, said color areas being interspersed with uncolored areas capable of transmitting such light to the photographic material to record the image in separated parts thereon.

5. A photographically sensitive color component comprising a transparent support, having separated mono-color filter areas thereon and having distributed between and upon the filter areas photographic material sensitized and adapted for recording in separated sections between the filter areas that color value of the subject which is complementary to the color of said areas, said filter areas preventing the passage of actinic light to those portions of the material upon the filter areas so that said portions, being unaffected by light, may be removed by the subsequent developing operation, and thus leave clear filter spaces between the image portions.

6. A photographically sensitive component for making a mono-color record of a subject, comprising a transparent support carrying a layer of photographic material sensitive to a given color and adapted to record the same color value of the subject, said support carrying separated lines of a single color and in light obstructing relation to the sensitive material and which lines will not transmit actinic light corresponding to said color value, said lines interspersed with spaces which will transmit said light to the sensitive material, whereby a broken lined image recording a mono-color value of the subject may be produced.

7. A photographic color picture transparency comprising small separated areas of photographic material recording a color value of a subject in a broken image, each area of which is adjacent to and interspersed with small color areas complementary in color to that of the color value of said image, further separated areas of photographic material opposite said color areas and bearing separated image portions recording a color value similar to the color of said color areas and areas of color complementary to the other color areas opposite said first mentioned image portions and interspersed with the second mentioned areas of photographic material, whereby each image may be viewed through a filter similar in color to that of the color value of the subject represented in said image and the broken images may be associated in the eye as a complete color picture, and means for supporting said areas.

8. The method of preparing a photographic positive color record of a subject comprising the steps of making red and green color separation negatives, printing the red color value negative on a photographic body sensitive to that color while screening the printing light from separated areas of the body so as to provide window spaces interspersed with image portions, printing the green color value negative on a photographic body sensitized to that color while screening the printing light from separated areas of said body to produce image and window areas, the window areas on the two bodies being so located that, when the bodies are superposed with their developed and fixed images in registry, the image on each may be viewed in part through the windows of the other, developing and fixing the positives and superposing the same in registry as above set forth, whereby each image may be viewed through a color filter corresponding with the color value thereof.

9. The method of preparing a photographic positive color record of a subject comprising the steps of making red and green color separation negatives, printing the red color value negative on a red sensitive photographic body while screening the printing light from the body along separated lines so as to make a lined positive image broken by window spaces, printing the green color value negative on a positive green sensitive body while screening the printing light from said green sensitive body along separated lines, the lines of the two bodies being so positioned that, when the bodies are superposed with their images in registration, the lines on one body will intersect those on the other, developing and fixing said positives and superposing the same in registry as above explained, so that each image may be viewed through a filter corresponding in color therewith.

10. The method of making a positive color record of a subject from two color separation negatives, comprising the steps of preparing a positive from one negative by light printing from the negative upon a sensitized body with a screen, having areas of a color complementary to the color value of the negative and separated by uncolored areas, between the negative and the sensitive coating of the body, so as to light record a broken positive image on said body opposite the spaces between the color areas, similarly preparing a positive record from the second negative through a similarly interposed second screen differing from the first in that the areas of color of the second are complementary to those of the first, the second screen being so positioned with reference to the negative that its color areas cover portions of the negative image which correspond with portions of the other negative image that were not covered by the color areas of the first mentioned screen, developing and fixing said positive images and superposing the positives and screens with the images in registration and with the screens in the same relative relation thereto as when the said images were light recorded.

11. The method of preparing a positive color record of a subject from two photographically sensitive screen components, each having thereon lines of a single color complementary to the color of the lines on the other, and separated by clear spaces covered with sensitive material, said method comprising the steps of making two color separation negatives of the subject, preparing a positive image from one negative by positioning in a light recording relation to said negative that sensitive screen component which bears a color complementary to the color value of the negative, and light recording said negative as a broken positive image on the spaces only between said color lines, positioning the second screen component in a light recording relation to the second negative with its lines at an angle on the negative image to the direction assumed by the lines on the first screen component, the two negative images having the same relative positions in each case, and light recording the second negative as a broken positive image only between the color lines on the second component, developing, fixing and finishing said positive images and superimposing the components with the images in registry to form a color record.

12. The process of making a positive photographic record in colors, comprising the steps of photographing a subject through a red filter on a red sensitive plate, photographing the same subject through a green filter on a green sensitive plate, developing and fixing the same, preparing a positive record from the first named negative by passing red light therefrom to a photographically red sensitive body through a color screen comprising green lines alternating with clear lines to record the red color value image in broken lines on said body, similarly preparing a second positive record from the second named negative by light transmitted from the negative to a green sensitive body through a screen having alternating red and transparent lines arranged at a relatively different angle on the negative from that occupied by the first named screen to make a broken image record of the green color values of the subject, developing and fixing said positives and superimposing them and the color screens with the images in registry and thereby producing a colored record of the subject photographed.

13. The method of preparing a positive color record of a subject from red and green color separation negatives on two complementarily colored photographically sensitive screen components embodying transparent supports, one carrying fine, spaced, red lines and a layer of green sensitive material thereover, the other carrying fine, spaced, green lines and a layer of red sensitive material, said method comprising the steps of superimposing the red color separation negative and a green lined component in a printing position with the color lines between the negative and the sensitive material of the component and printing by red light a broken positive image in the clear spaces between the color lines, similarly superimposing the green separation negative in a printing position over a red lined component with the red lines between the negative and the sensitive material of the component and located at an angle to the direction of the green lines relative to the image during the printing operation, printing a broken positive image recording the green color values by means of green light, developing and fixing the positive images thereby removing the sensitive material behind the color lines to provide filter windows and superimposing the screen components with the images in registry and visible in part at least through the windows so that they may be associated in the eye as a complete picture.

14. A picture transparency having a partial image on one side regularly subdivided into spaces and image portions, and another partial image on the other side regularly subdivided into spaces and image portions, the image portions on each side being backed with such respectively different colors as to additively produce a resultant color effect in projection.

15. A picture transparency having a partial color value image on one side regularly subdivided into spaces and image portions, and another partial color value image on the other side regularly subdivided into spaces and image portions, the image portions on each side being backed with a color corresponding to the color value thereof.

In witness whereof I affix my signature this 3rd day of May, 1916, in the presence of two witnesses.

MARCUS C. HOPKINS

Witnesses:
HUGH DAVIS,
CLAYTON L. JENKS.

Certificate of Correction.

It is hereby certified that in Letters Patent No. 1,460,673, granted July 3, 1923, upon the application of Marcus C. Hopkins, of Rochester, New York, for an improvement in "Methods of Color Photography and Photographic Elements," an error appears in the printed specification requiring correction as follows: Page 8, line 119, claim 12, after the word "screen" insert the word *lines;* and that the said Letters Patent should be read with this correction therein that the same may conform to the record of the case in the Patent Office.

Signed and sealed this 31st day of July, A. D., 1923.

[SEAL.]
KARL FENNING,
*Acting Commissioner of Patents.*